United States Patent
Gontermann et al.

(10) Patent No.: US 10,396,608 B2
(45) Date of Patent: Aug. 27, 2019

(54) ROTOR, RELUCTANCE MACHINE AND METHOD FOR MANUFACTURING THE ROTOR

(71) Applicant: KSB Aktiengesellschaft, Frankenthal (DE)

(72) Inventors: Daniel Gontermann, Frankenthal (DE); Boris Janjic, Frankenthal (DE); Michael Koenen, Frankenthal (DE); Jochen Schaab, Frankenthal (DE); Axel Schunk, Frankenthal (DE)

(73) Assignee: KSB Aktiengesellschaft, Frankenthal (DE)

( * ) Notice: Subject to any disclaimer, the term of this patent is extended or adjusted under 35 U.S.C. 154(b) by 29 days.

(21) Appl. No.: 15/501,758

(22) PCT Filed: Aug. 4, 2015

(86) PCT No.: PCT/EP2015/067908
§ 371 (c)(1),
(2) Date: Feb. 3, 2017

(87) PCT Pub. No.: WO2016/020363
PCT Pub. Date: Feb. 11, 2016

(65) Prior Publication Data
US 2017/0237307 A1  Aug. 17, 2017

(30) Foreign Application Priority Data
Aug. 4, 2014 (DE) .......... 10 2014 215 304

(51) Int. Cl.
*H02K 21/12* (2006.01)
*H02K 1/24* (2006.01)
(Continued)

(52) U.S. Cl.
CPC ......... *H02K 1/246* (2013.01); *H02K 15/0012* (2013.01); *H02K 19/02* (2013.01); *H02K 19/14* (2013.01)

(58) Field of Classification Search
CPC .................. H02K 1/246; H02K 19/02
(Continued)

(56) References Cited

U.S. PATENT DOCUMENTS 2,975,310 A * 3/1961 Armstrong ............. H02K 19/14
310/163
5,818,140 A * 10/1998 Vagati ..................... H02K 1/246
310/185
(Continued)

FOREIGN PATENT DOCUMENTS

DE          199 34 033 A1    2/2000
DE    10 2013 201 353 A1    8/2013
(Continued)

OTHER PUBLICATIONS

International Search Report (PCT/ISA/210) issued in PCT Application No. PCT/EP2015/067908 dated Oct. 23, 2015 with English translation (five pages).
(Continued)

*Primary Examiner* — Hanh N Nguyen
(74) *Attorney, Agent, or Firm* — Crowell & Moring LLP

(57) ABSTRACT

A rotor for a reluctance machine and a method of producing a rotor for a reluctance machine is provided. The rotor is formed as a soft magnetic element which is cylindrical in shape. The soft magnetic element has recesses for forming flux barriers, one or more flux barriers being at least partially filled with a filler material, and the filler material of said flux barriers extending up to the rotor periphery and forming part of the rotor periphery.

14 Claims, 7 Drawing Sheets

(51) Int. Cl.
  *H02K 19/14* (2006.01)
  *H02K 15/00* (2006.01)
  *H02K 19/02* (2006.01)

(58) Field of Classification Search
  USPC .................................. 310/156.57, 162, 163
  See application file for complete search history.

(56) References Cited

U.S. PATENT DOCUMENTS

| | | | |
|---|---|---|---|
| 6,121,706 | A | 9/2000 | Nashiki et al. |
| 6,865,796 | B1* | 3/2005 | Oohashi ................... H02K 3/12 |
| | | | 242/432 |
| 7,282,829 | B2 | 10/2007 | Jung et al. |
| 2003/0173861 | A1* | 9/2003 | Kawaguchi ............ H02K 1/246 |
| | | | 310/61 |
| 2007/0108853 | A1* | 5/2007 | Shah ...................... H02K 1/246 |
| | | | 310/61 |
| 2007/0152527 | A1 | 7/2007 | Yura et al. |
| 2007/0170803 | A1* | 7/2007 | Yabe ....................... H02K 1/20 |
| | | | 310/162 |
| 2010/0001608 | A1 | 1/2010 | Kolehmainen |
| 2015/0015093 | A1 | 1/2015 | Gontermann et al. |

FOREIGN PATENT DOCUMENTS

| | | |
|---|---|---|
| EP | 0 650 245 A1 | 4/1995 |
| JP | 2000-197325 A | 7/2000 |
| JP | 2003-259615 A | 9/2003 |

OTHER PUBLICATIONS

German-language Written Opinion (PCT/ISA/237) issued in PCT Application No. PCT/EP2015/067908 dated Oct. 23, 2015 (six pages).
German Office Action issued in counterpart German Application No. 10 2014 215 304.2 dated May 5, 2015 (seven pages).
International Preliminary Report on Patentability (PCT/IB/338 & PCT/IB/373) issued in PCT Application No. PCT/EP2015/067908 dated Feb. 16, 2017, including English translation of Document C2 (German-language Written Opinion (PCT/ISA/237)) previously filed on Feb. 3, 2017 (Nine (9) pages).
Japanese-language Office Action issued in counterpart Japanese Application No. 2017-505795 dated Dec. 26, 2018 (five (5)pages).
English translation of document B4 (JP 2000-197325 A previously filed on Mar. 4, 2019) (24 pages).

\* cited by examiner

ROTOR, RELUCTANCE MACHINE AND METHOD FOR MANUFACTURING THE ROTOR

This application is a National Stage of PCT International Application No. PCT/EP2015/067908, filed Aug. 4, 2015, which claims priority under 35 U.S.C. § 119 from German Patent Application No. 10 2014 215 304.2, filed Aug. 4, 2014, the entire disclosures of which are herein expressly incorporated by reference.

BACKGROUND AND SUMMARY OF THE INVENTION

The invention relates to a rotor for a reluctance machine comprising a cylindrical soft-magnetic element, wherein the soft-magnetic element has cutouts for forming flux barriers. The invention further relates to a reluctance machine having a corresponding rotor and also to a method for manufacturing a rotor of this kind.

Rotors for synchronous reluctance machines are usually equipped with a cylindrical soft-magnetic element which is arranged coaxially on the rotor axis. In order to form at least one pole pair or gap pair, the soft-magnetic element comprises flux-conducting and flux-blocking portions, which differ from one another by a magnetic permeability of differing degrees. The portion with high magnetic conductivity is identified, as is known, as the d-axis of the rotor, and the portion with comparatively lower conductivity is identified as the q-axis of the rotor. An optimal degree of efficacy of the reluctance motor and therefore an optimal torque yield is provided when the d-axis has the greatest possible magnetic conductivity and the q-axis has the lowest possible magnetic conductivity.

This precondition is often satisfied by the formation of a plurality of cutouts, which are filled with air, in the soft-magnetic element along the q-axis, as a result of which the magnetic flux in the direction of the q-axis is inhibited and consequently the permeability decreases. The soft-magnetic element constructed in this way is then mounted on a rotor shaft and fixed axially and also tangentially.

For stability reasons, one or more flux barriers is/are divided into two by radially oriented inner webs. The web arrangement increases the strength of the laminated core, which in particular optimizes the rotor stability during operation. The width of the webs is low in order to keep the influence on the permeability as low as possible. Webs, which delimit the flux barriers from the rotor periphery, also run on the outer rotor periphery.

Synchronous reluctance motors are regularly fed via a frequency converter, as a result of which the rotation speed can rise from 0 to operating speed and can be adjusted during operation. In particular, the rotation speed for starting the motor can be increased in steps. If the synchronous reluctance motor by contrast is operated in a fixed grid, the use of a starting cage is necessary in order enable asynchronous starting. As soon as the rotation speed of the rotor approaches the synchronous rotation speed, the reluctance torque becomes predominant and the rotor runs synchronously with the rotating field. However, the structure and manufacture of conventional starting cages, comprising conductor bars and short-circuiting rings, have been comparatively complicated and expensive to date.

The object of the present invention is to demonstrate an alternative rotor structure which is distinguished by an optimum ratio of the magnetic resistances along the d-axis and q-axis and nevertheless ensures a stable rotor design.

According to the invention, one or more flux barriers is/are at least partially filled with a suitable filler material. The filler material of these flux barriers directly reaches the outer periphery of the rotor and accordingly forms a portion of the rotor periphery. The conventional web profile on the rotor periphery can be dispensed with, and the rotor periphery is consequently formed at least in portions by the filler material within the one or more flux barriers which adjoin the rotor periphery.

Since the webs are usually formed from the material of the rotor, that is to say a magnetically conductive material, preferably the lamination or a stacked laminated core, the design of said webs in the region of the q-axis has a disadvantageous effect on the magnetic resistance along the q-axis, that is to say this leads to an increase in the permeability along the q-axis. As a result, influencing of the resistance ratio between the q-axis and d-axis, which is disadvantageous for motor operation, has to be accepted. The resistance ratio between the d-axis and the q-axis can be optimized for rotor operation, in order to achieve a higher torque, owing to the inventive configuration of the rotor, that is to say the cutting out of at least some of the webs which are usually provided on the outer periphery. Nevertheless, a stable rotor design is ensured by the provided filler material in the outer region of the respective flux barriers.

In a preferred refinement of the invention, the flux barriers of the rotor are filled with the filler material at least in regions in such a way that an inner region with unfilled flux barriers or non-filled flux barrier regions and an outer region with filled flux barriers or filled flux barrier regions are produced. It is conceivable, for example, for the division of the inner and outer region by the arrangement to produce one or more webs, wherein the profile of the individual webs forms a closed line which divides the rotor in the radial direction into an inner and an outer rotor region. Most preferably all, of the flux barrier portions of the outer rotor region are filled with a corresponding filler material. Flux barriers or flux barrier regions of the inner rotor region can also be filled, preferably with a magnetically non-conductive and/or electrically non-conductive filler material.

Owing to the use of a suitable filler material, that is to say an electrically conductive filler material, a starting cage can be formed with the aid of the outer rotor region. A reluctance motor which uses the rotor can consequently be operated without a frequency converter as a so-called "line-start motor". The starting cage formed is generally short-circuited by short-circuiting rings which are fastened at the end in the axial direction. The resulting starting cage operates in accordance with the known principle of the starting aids used in asynchronous motors.

It is further conceivable for the electrically conductive filler material used to be characterized by its magnetically non-conductive properties. As a result, disadvantageous influencing of the permeability in the flux barrier portion is avoided.

A particularly preferably suitable filler material is aluminum or an aluminum alloy since materials of this kind have the abovementioned properties. However, other materials which are distinguished by corresponding properties are also conceivable.

Ideally, all of the flux barriers which directly adjoin the outer rotor periphery are filled with the filler material at least in their peripheral region in order to achieve a high degree of stability of the rotor core and at the same time to cut out all of the web sections in the region of the flux barriers which adjoin the periphery in order to thereby allow an almost optimum resistance ratio between the q-axis and the d-axis.

It is likewise conceivable for one or more flux barriers to be divided into two or more by one or more webs. The design of these webs has, as already explained above, a disadvantageous effect on the properties of the permeability in the respective rotor portion. For this reason, the dimensions, in particular the thickness, of the webs formed should be kept as small as possible in order to restrict the influence on the resistance ratio as far as possible. However, when introducing the filler material used, in particular the aluminum or the aluminum alloy, a certain pressure can act on the webs, this possibly leading to the webs being damaged or broken under certain circumstances. Therefore, a suitable happy medium has to be found for the dimensions of the webs for optimum rotor operation. Against this background, a curved edge shape of the one or more webs has proven to be particularly advantageous. Curvature of the edges leads to increased resistance of the webs when the filler material is pressed in, but without widening of the webs and a resulting greater influence on the permeability of the rotor disadvantageously having to be accepted. An arcuate edge shape is particularly preferred.

Furthermore, it is extremely advantageous when the at least one curved edge which adjoins a filled region of the flux barrier is bent into the filled region of the flux barrier. In this case, the resistance of the web during the filling process is considerably increased. The shape of the edge which adjoins the non-filled region of the flux barrier is less relevant and can be designed in any desired manner. However, said edge is preferably likewise curved, wherein the edge bends out of the non-filled region of the flux barrier.

The present invention further comprises a reluctance machine, in particular a synchronous reluctance machine, comprising at least one rotor according to the present invention or an advantageous refinement of the rotor according to the present invention. The reluctance machine is consequently distinguished by the same advantages and properties as the rotor according to the invention or an advantageous refinement of the rotor according to the invention, and therefore is not described again here. Owing to the refinement according to the invention of the rotor, in particular the position of the filler material introduced, it is possible not only to realize a starting cage but at the same time to achieve an improved torque of the rotor by reducing the number of webs.

The machine preferably serves for driving the pump. The invention therefore also includes a pump comprising a reluctance or synchronous reluctance motor according to the present invention.

A further aspect of the present invention relates to a method for manufacturing the rotor according to the invention. In said method, the rotor is initially produced with outer webs and the filler material is introduced into the provided flux barriers of the soft-magnetic rotor element. In this case, the outer webs are understood to be those webs which are formed from the soft-magnetic element and are situated in the region of the rotor periphery, that is to say the provided cutouts in the soft-magnetic element for forming the flux barriers do not directly reach the rotor periphery, but rather are spaced apart from the outer periphery by the webs. The rotor periphery is accordingly completely formed by the soft-magnetic element.

After the filler material has been introduced into the flux barriers, a sufficient degree of stability of the rotor core can be ensured, and therefore the outer webs are subsequently removed according to the invention. Ideally, the outer webs are removed in the region of those regions of the flux barriers which are situated on the outside in the radial direction of the rotor, that is to say the filler material of the flux barriers directly adjoins the rotor periphery and therefore forms a portion of the rotor periphery.

The rotor core is generally composed of a stacked laminated core and is preferably produced by rotation. Material layers of the soft-magnetic element can be removed from the rotor periphery by overrotation of the rotor core, and therefore the outer webs are removed in the region of the outer flux barrier portions which adjoin the periphery.

Furthermore, it is advantageous when the filler material used is introduced, in particular pressed, into the flux barriers by casting processes, in particular by die-casting processes.

Other objects, advantages and novel features of the present invention will become apparent from the following detailed description of one or more preferred embodiments when considered in conjunction with the accompanying drawings.

DETAILED DESCRIPTION

Figure 1:
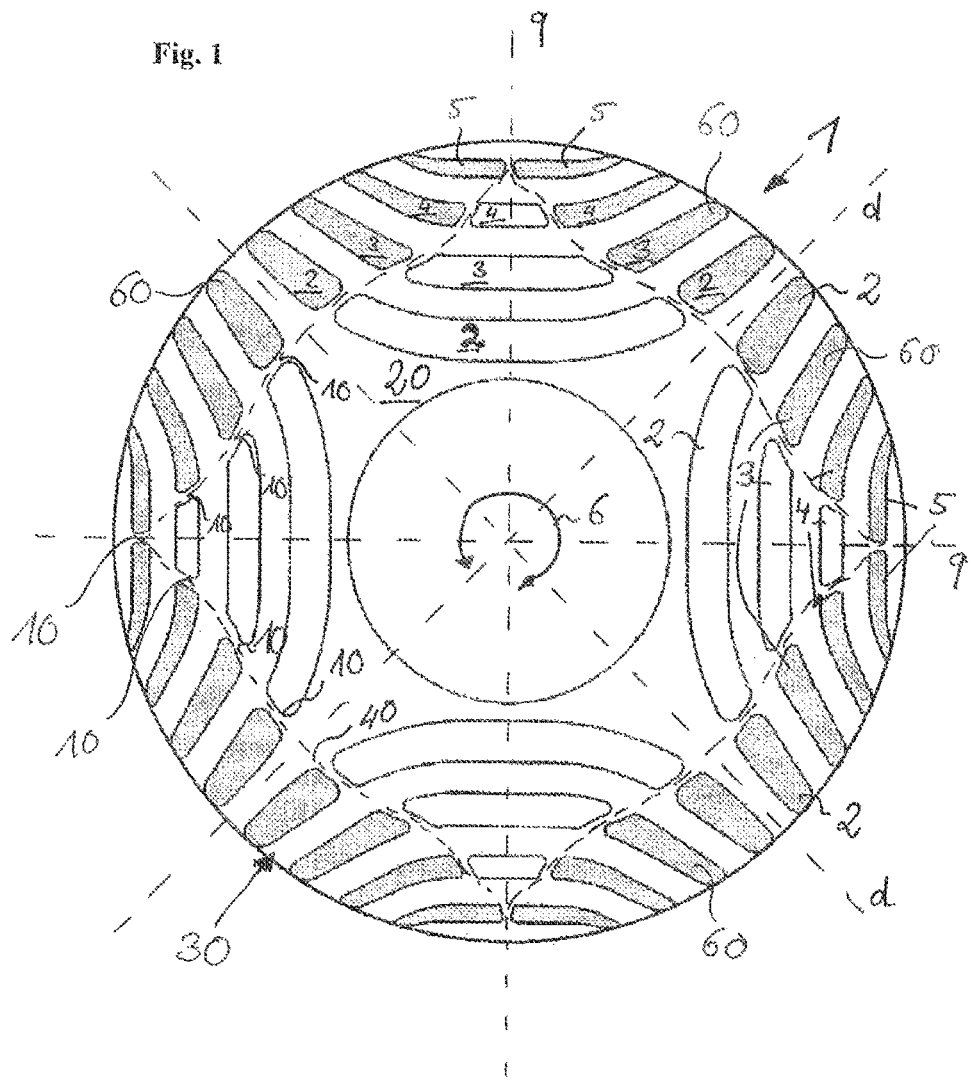
FIG. 1 shows a rotor lamination of a rotor according to the invention in accordance with a first embodiment.

FIG. 1 shows a plan view of a rotor lamination 1 according to the invention. A large number of laminations 1 of this kind are stacked one on top of the other in an axial direction, that is to say along the rotation axis 6, for the construction of the rotor according to the invention. In order to simplify the illustration, the stator is not shown. The rotor lamination 1 has a plurality of cutouts 2, 3, 4, 5, which take on the function of flux barriers and the arrangement of which forms a four-pole rotor, the magnetic flux of said rotor being inhibited in the regions with the flux barriers 2, 3, 4, 5. The region with high magnetic conductivity is generally identified as the d-axis, and the region of lower magnetic conductivity is generally identified as the q-axis. The assembled laminated core is mounted on a rotor shaft, not illustrated. The arrangement of the individual flux barriers 2, 3, 4, 5 is based on the technical teaching of U.S. Pat. No. 5,818,140, to which reference is made expressly in this regard. The rotor lamination therefore exhibits four flux barrier portions, wherein the flux barriers in these regions are of identical construction to one another. The flux barriers can be described as banana-shaped, the ends of said flux barriers being curved in the direction of the rotor periphery and reaching the periphery.

However, the rotor construction illustrated differs from the conventional design according to U.S. Pat. No. 5,818,140 by virtue of the arrangement of the individual webs 10, by which the individual flux barriers 2, 3, 4, 5 are divided into two or more in different portions. One characterizing feature is that the radially inner flux barriers 2, 3, 4 of each sector of the circle are divided into three by two webs 10, while the outermost flux barrier 5 in the radial direction is divided into two only by one web 10.

The arrangement of the individual webs 10 not only ensures improved lamination stability during rotor operation, but also additionally divides the rotor lamination 1 into an inner partial region 20 and an outer partial region 30. The circular dashed line 40 which indicates the boundary profile between the inner and outer rotor region 20, 30 is shown in order to illustrate the division between regions. The number of flux barriers situated within the region 20 or inner flux barrier regions is, in principle, variable and the size ratio of the inner and outer region 20, 30 is not a subject matter of this invention.

The outer magnetic flux barriers 5 and those partial regions of the flux barriers 2, 3, 4 which are situated in the region 30 serve to form a starting cage. To this end, short-circuiting rings, not illustrated, are fastened to the end face during rotor construction, it being possible for said short-circuiting rings to be taken, for example in an unchanged form, by the starting cage of an asynchronous machine. Additional provisions which are made for a starting cage, such as the metal rods which are often incorporated, can be dispensed with as a result.

Figure 2A:
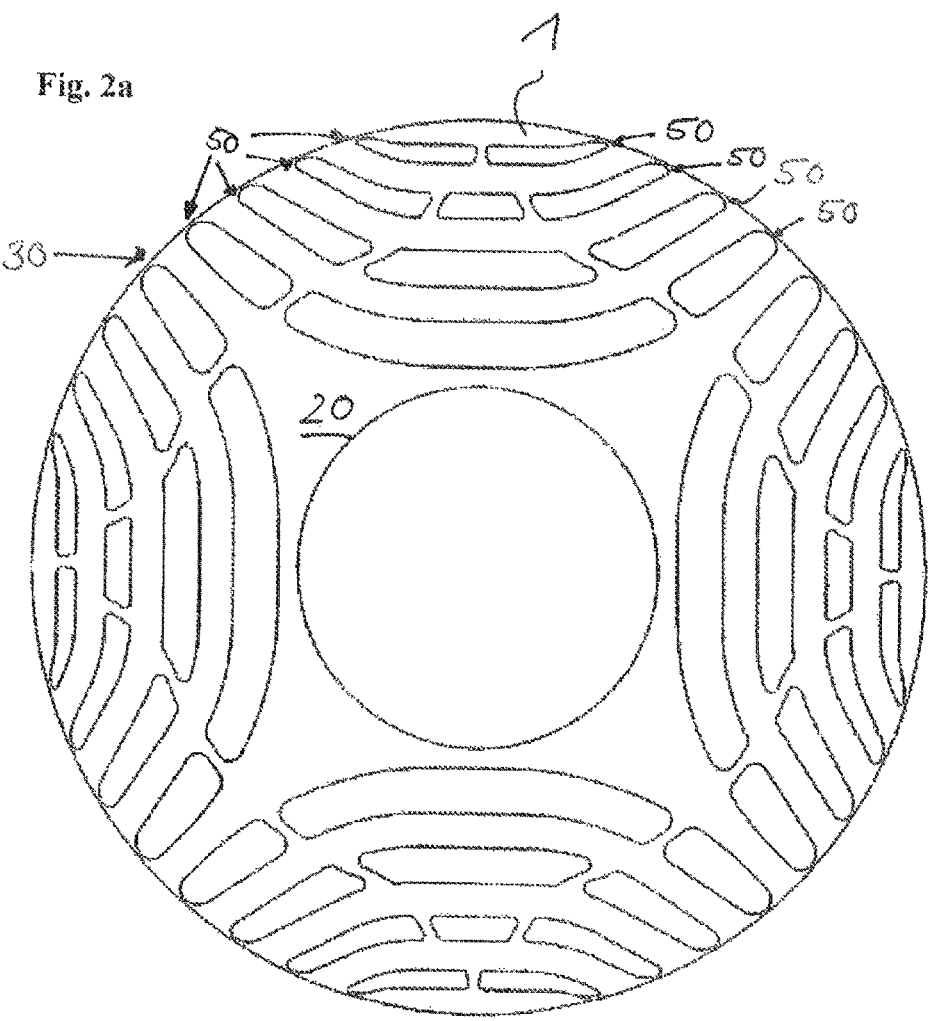
FIGS. 2A and 2B show illustrations of the rotor lamination according to FIG. 1 during individual method steps of the manufacturing method according to the invention.
Figure 2B:
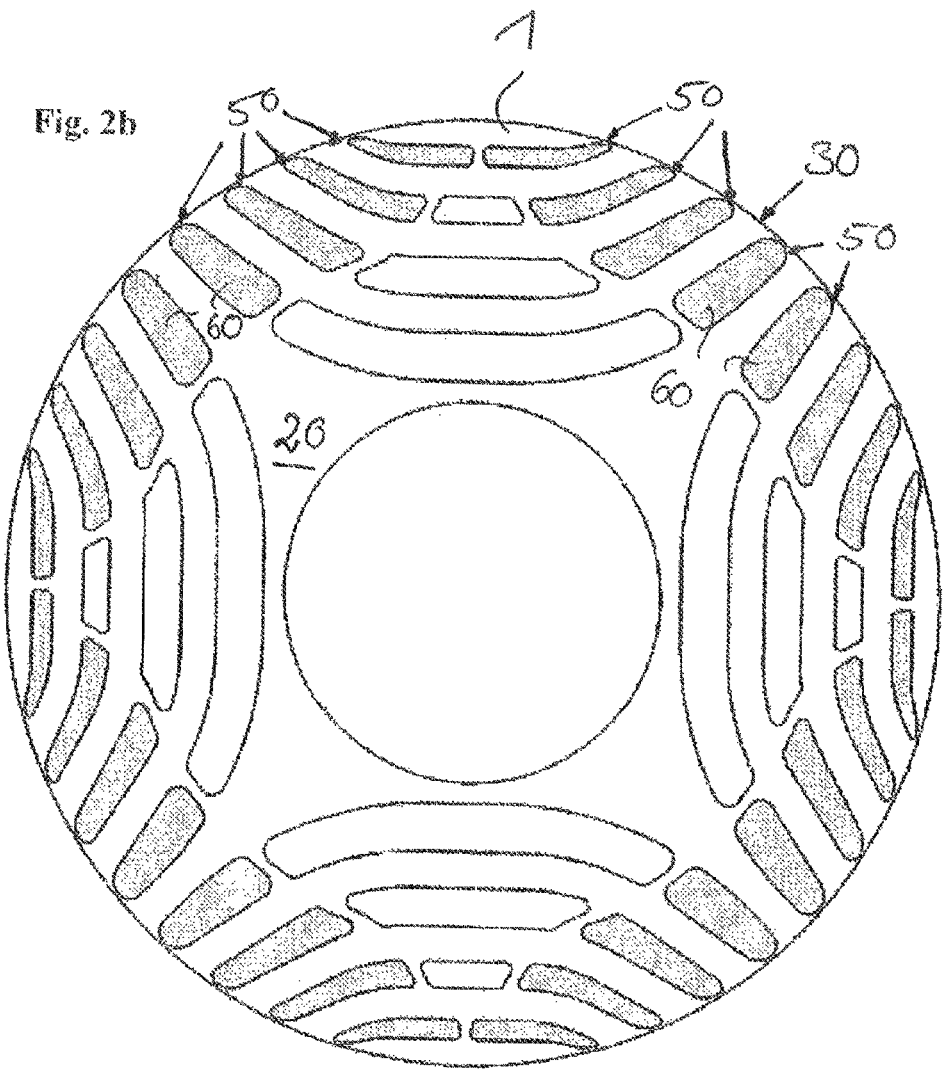

At least the regions of the flux barriers of the outer rotor region 30 are filled with an electrically conductive and magnetically non-conductive material, in particular with a filler which is composed of aluminum or an aluminum alloy. In the illustration of FIGS. 1 and 2*b*, this is shown by the gray filler color 60. Those flux barrier regions of the flux barriers 2, 3, 4 which are situated in the region 20 can either be filled with a magnetically non-conductive material or only contain air. The filler used should preferably be electrically non-conductive or electrically poorly conductive.

The flux barrier regions of the outer rotor portion 30 directly reach the outer periphery of the rotor in the radial direction, so that the rotor periphery is partially formed from the filler material which comprises the aluminum or the aluminum alloy. The previously provided webs at the rotor periphery are no longer present, as a result of which the magnetic resistance of the flux barrier portion is increased and the ratio between the q-axis and the d-axis is optimized. By filling the flux barriers or flux barrier regions which adjoin the rotor periphery, the previously provided webs can first be removed without appreciable losses in stability of the rotor core having to be accepted. In principle, it is not necessary for all of the flux barriers or flux barrier regions which are situated on the outside and adjoin the rotor periphery to be filled. It is sufficient for the concept of the present invention for the one or more flux barriers in the vicinity of the peripheral region to be filled in order to dispense with the disadvantageous webs in this region. This already results in an improved ratio of the magnetic resistances in the d-axis and q-axis, this leading to an increase in the resulting reluctance torque of the synchronous reluctance motor which uses the rotor. The use of a suitable filler for forming a starting cage and the above-described web arrangement of the webs 10 is merely optional.

It is possible to introduce the filler material into the flux barriers 5 and the outer regions of the flux barriers 2, 3, 4 in different ways. Introduction by casting is possible. It goes without saying that the filler materials can also be inserted into the cutouts 2, 3, 4, 5 in solid form.

The method for manufacturing the rotor according to the invention will now be explained with reference to FIGS. 2A and 2B. The rotor laminations 1 of the stacked laminated core of the rotor, which laminated core is made up of individual laminations, are produced with the above-described flux barrier arrangement. The inner webs 10, that is to say the webs which subdivide the individual flux barriers and are not situated in the region of the rotor periphery, form the known line 40, already described, which divides the rotor into an inner and an outer rotor region 20, 30. However, the rotor lamination 1 is initially produced with outer webs 50 which are shown in the illustration according to FIG. 2*a*.

The flux barrier portions which are situated in the outer rotor region 30 are then filled with aluminum or an aluminum alloy, wherein an aluminum die-casting process is substantially used here. In the process, the aluminum or the aluminum alloy is pressed into the flux barrier portions of the outer rotor region 30. A rotor lamination according to the illustration of FIG. 2*b* is produced.

In a subsequent method step, the rotor is turned, so that the diameter of the lamination reduces and the periphery shrinks. The material layer which forms the outer webs 50 disappears and the two ends of the banana-shaped flux barriers 2, 3, 4, 5 directly adjoin the rotor periphery, that is to say the aluminum or the aluminum alloy is open to the periphery and forms a portion of the rotor periphery. The result corresponds to the illustration according to FIG. 1. Owing to the respective webs 50 in this region disappearing, the permeability along the q-axis is reduced and therefore the ratio between the q-axis and the d-axis is optimized. Furthermore, owing to the presence of the aluminum cage in the region of the outer rotor portion 30, the mechanical strength is achieved even without these outer webs 50 of the laminated rotor core.

The inner webs 10 also have a negative effect on the ratio of the permeability between the d-axis and the q-axis, and therefore the number and the material thickness should be kept as low as possible. However, the inner webs 10 are required for ensuring the stability of the rotor. As the filler material, that is to say the aluminum or the aluminum alloy, is introduced or pressed into the flux barriers 5 or the flux barrier portions 2, 3, 4 in the outer rotor segment 30, high forces act on the webs 10 of the flux barriers which are to be filled, as a result of which the inner webs 10 may be damaged.

Figure 3:
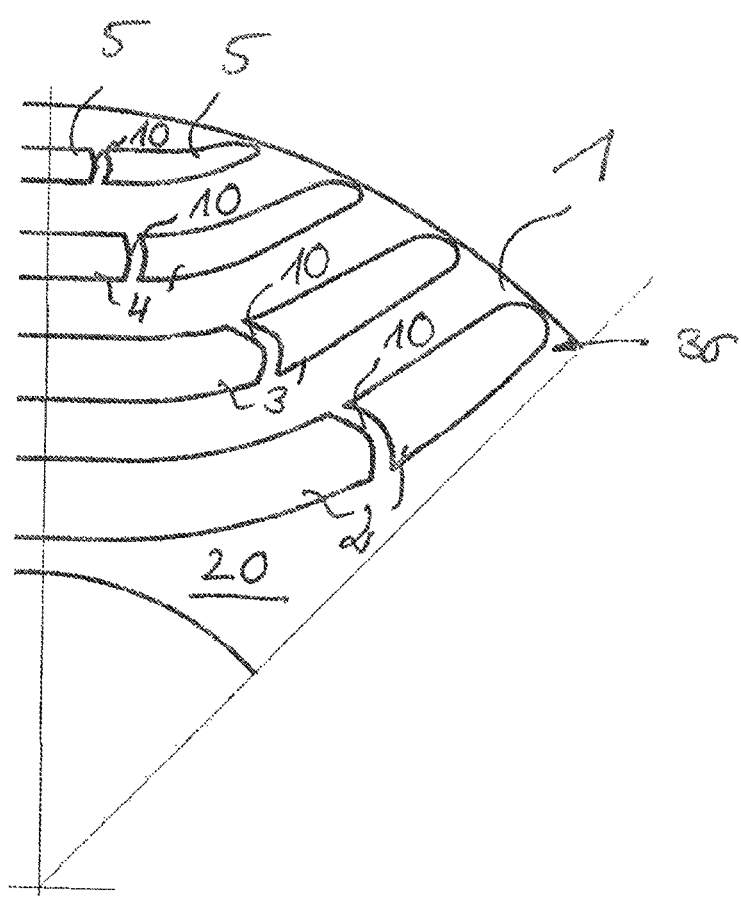
FIG. 3 shows a view of a detail of the rotor lamination according to the invention in accordance with FIG. 1.

Instead of making the dimensions of the webs 10 thicker, said webs are now designed in arcuate form, as is clear from the view of a detail in FIG. 3. Said view shows one eighth of the rotor lamination of FIG. 1. The remaining rotor region is symmetrical to the illustration of FIG. 3.

The arcuate ribs 10 stabilize the rotor during the aluminum die-casting operation. Aluminum is pressed into the flux barriers 5 and flux barrier regions of the flux barriers 2, 3, 4, which flux barriers and flux barrier regions are situated in the outer region 30, under high pressure, while normal ambient pressure prevails on the inside. As a result, a compressive stress which stabilizes the rotor is built up in the arcuate ribs. Therefore, the rotor structure can be effectively prevented from collapsing.

In particular, the arcuate rib structure exhibits a curvature into the filled flux barrier region, so that the pressure of the aluminum die-casting counteracts the arc. Therefore, the thickness of the inner ribs 10 can be further reduced, as a result of which these can nevertheless withstand the high pressure of the aluminum during casting.

Figure 4:
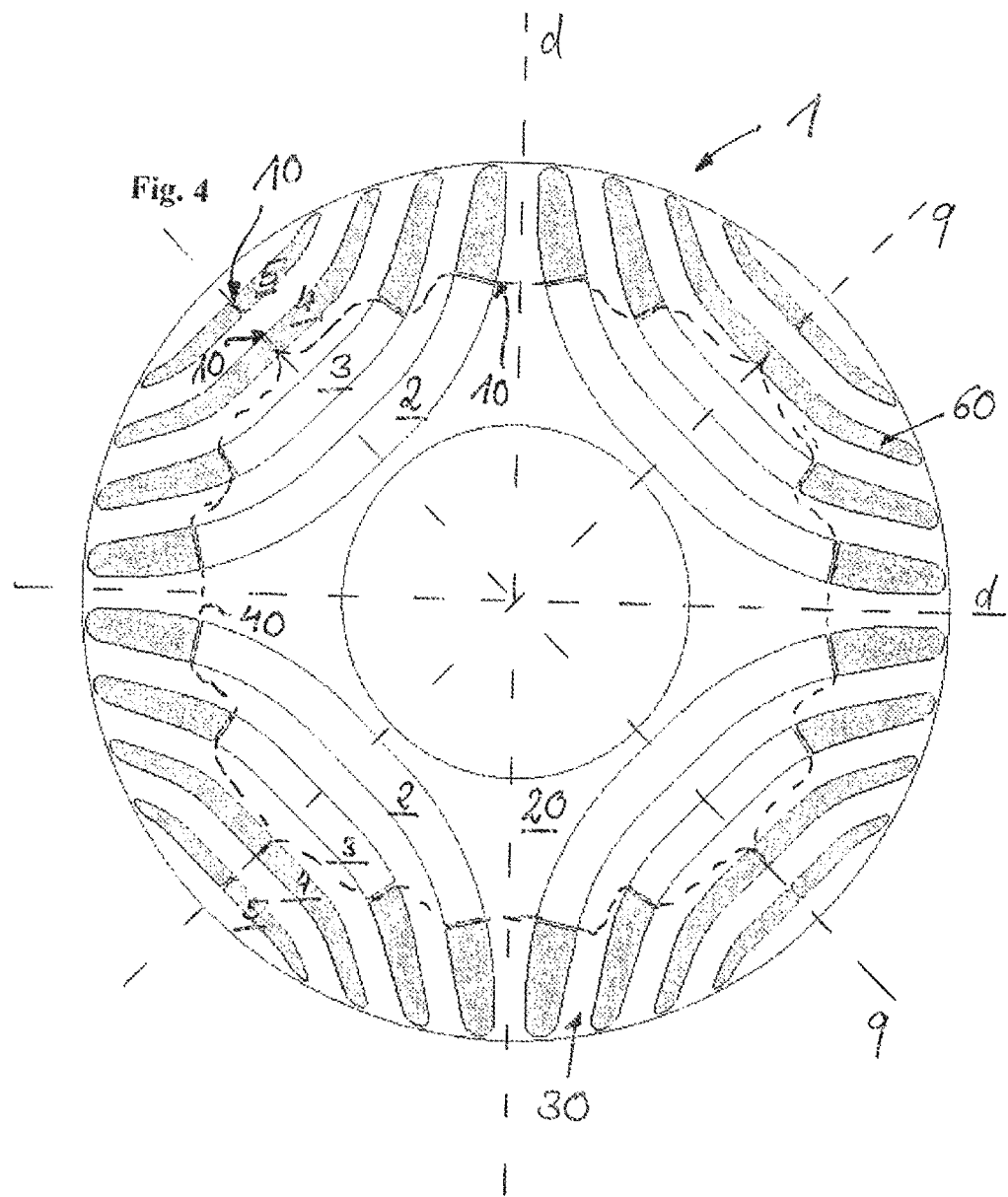
FIG. 4 shows an illustration of a rotor lamination of a first alternative rotor according to the invention.
Figure 5:
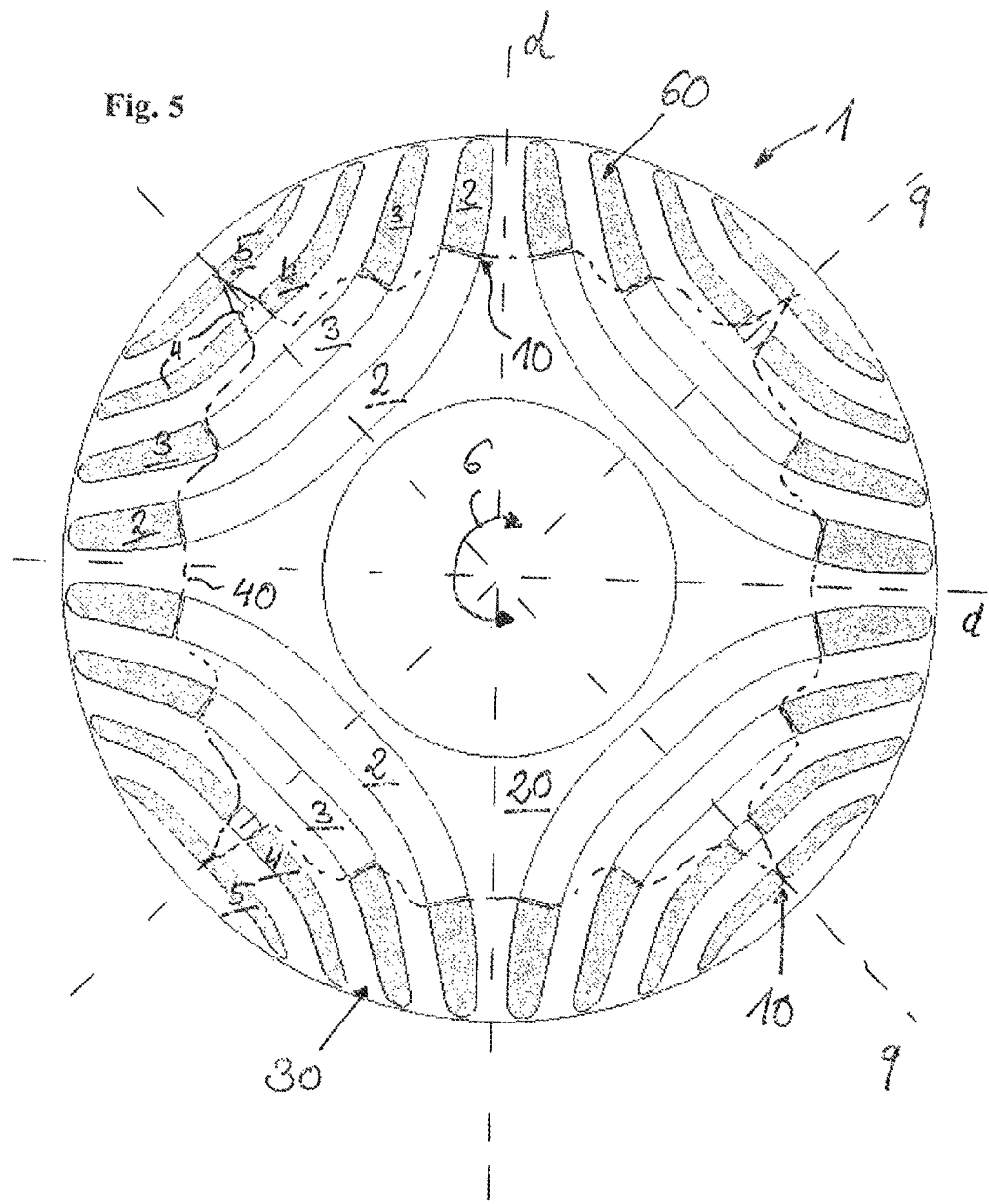
FIG. 5 shows a third illustration of a rotor lamination of a second alternative rotor according to the invention.

Optional features of a rotor, which features are not intended to be understood as essential features of the invention, will be described below. In the exemplary embodiment of FIG. 1, the regions of the flux barriers of the outer rotor region 30 are filled with an electrically conductive and magnetically non-conductive material, in particular with a filler which is composed of aluminum or an aluminum alloy. Additional variants are shown in FIGS. 4 and 5. In the illustrations of FIGS. 1 and 4 and 5, the aluminum or the alloy is shown by the gray filler color 60. Those flux barrier regions of the flux barriers 2, 3, 4 which are situated in the region 20 can either be filled with a magnetically non-conductive material or only contain air. The filler used should preferably be electrically non-conductive or electrically poorly conductive.

The ratio of the area of the filled region of the flux barriers 2, 3, 4, 5 to the area of the non-filled region of the flux barriers 2, 3, 4 is important for the starting behavior of the rotor, that is to say the synchronization of the rotation speed with the grid frequency, in a synchronous reluctance motor. If the fill area is too small, the starting cage formed is too small and a rotor under load cannot start without mechanical assistance. If the filling quantity is selected to be too large, the oscillating mass disadvantageously increases and the operating behavior of the motor is likewise impaired. It is therefore necessary to find an optimum ratio, in particular for the application of the rotor for use in a drive motor of a pump.

For the definition, the area of the filler material which is used for all of the flux barriers 2, 3, 4, 5, which is shown in the lamination cross section, is added up and a ratio is formed to the area of the correspondingly non-filled regions of all of the flux barriers 2, 3, 4. In the illustrations of FIGS. 1 and 4 and 5, this corresponds to the ratio of all of the areas 60, shown in gray, within the flux barriers 2, 3, 4, 5 to the ratio of the non-gray background areas within the flux barriers 2, 3, 4.

A suitable ratio of the area of the filled region of the flux barriers 2, 3, 4, 5 to the area of the region of the non-filled flux barriers 2, 3, 4 has been found to be a value of at least 0.2. The ratio is preferably in the range of between 0.2 and 3, particularly preferably in the range of between 0.3 and 3, ideally in the range of from 0.75 to 1.5.

Furthermore, the areas of the filled regions of the flux barriers 2, 3, 4 are matched to one another, that is to say are selected to be identical. Under certain circumstances, this criterion cannot be complied with for the outermost flux barrier 5 since the area of said outermost flux barrier provides too small a filling space.

A further criterion is that the ratio between the filled region and the non-filled region of the flux barrier 2 which is situated on the inside in the radial direction of the rotor is at least 0.2, preferably in the range of between 0.2 and 2, particularly preferably a range of between 0.35 and 0.8, and ideally between 0.35 and 0.6. In the exemplary embodiment of FIG. 4, this ratio is 0.5, while a smaller ratio for the innermost flux barrier 2, for example of approximately 0.3, has been assumed for the exemplary embodiment of FIG. 5. A ratio of between 0.3 and 0.5 has been set for the exemplary embodiment of FIG. 1.

The area of the filled regions of the partially filled flux barriers 3, 4 which are situated further on the outside in the radial direction is matched in terms of size to the area of the filled region of the inner flux barrier 2 or is virtually identical to said area.

Figure 6:
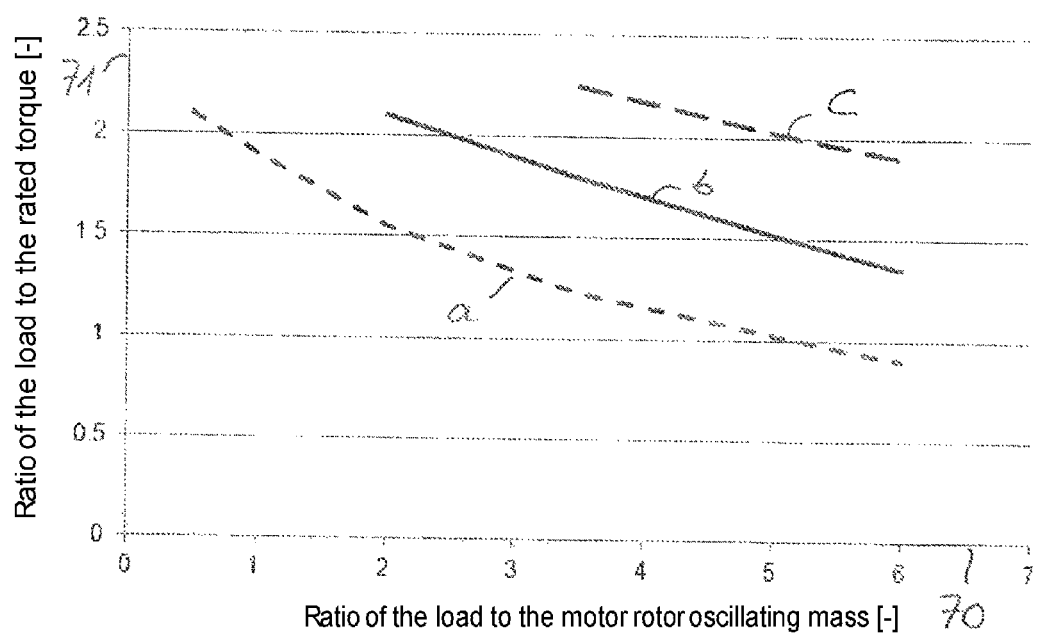
FIG. 6 shows a graph for illustrating the relationship between the area ratio and operating behavior of the rotor or the reluctance machine according to the invention.

The pull-in boundary characteristic curves for different area ratios in synchronous reluctance rotors are illustrated in FIG. 6. In the illustrated graph, the axis 70 corresponds to the ratio of the load to the motor oscillating mass, and the axis 71 corresponds to the ratio of the load to the rated torque. The areas under the respective curves a, b, c define the regions in which the line-start synchronous reluctance motor reliably starts or can be synchronized. In said graph, curve a characterizes the operating behavior of a rotor which is not covered by the invention and the lamination geometry of which corresponds to the exemplary embodiments of FIGS. 1 and 4 and 5 but the flux barriers of which are all completely filled with an aluminum or an aluminum alloy.

Curve b shows the operating behavior of the rotor according to the invention of FIG. 5 with an area ratio of the innermost flux barrier 2 of 0.3. The uppermost characteristic curve c can be associated with the rotor from the exemplary embodiment of FIG. 4 with an area ratio of the innermost flux barrier of 0.5.

FIG. 6 also shows that a considerable improvement in the starting ability of the line-start reluctance motor can be achieved by increasing the size of the region in which the motor is reliably synchronized, or the area under the curves b and c, by optimizing the area ratio in a targeted manner.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A rotor for a reluctance machine, comprising:
   a cylindrical soft-magnetic element; and
   a filler material,
   wherein
   the soft-magnetic element includes a plurality of flux barriers in the form of cutouts arranged circumferentially about a rotational axis of the rotor,
   a first portion of the plurality of flux barriers are located in a peripheral region of the rotor and are at least partially filled with the filler material,
   a second portion of the plurality of flux barriers are located in an inner region of the rotor and do not include the filler material,
   the filler material in the in the first portion of the plurality of flux barriers extends radially outward to an radially outer surface of the rotor, and
   at least one of the plurality of flux barriers is subdivided by a web having a first arcuate curved edge facing into a first portion of the at least one of the plurality of flux barriers which extends to the radially outer surface of the rotor.

2. The rotor as claimed in claim 1, wherein
   the filler material in the first portion of the flux barriers in the peripheral region of the rotor is electrically conductive and is arranged in the peripheral region of the rotor to form a starting cage.

3. The rotor as claimed in claim 1, wherein
   the filler material in the first portion of the flux barriers the peripheral region of the rotor is magnetically non-conductive.

4. The rotor as claimed in claim 1, wherein
   the filler material in the first portion of the flux barriers the peripheral region of the rotor is electrically conductive and magnetically non-conductive.

5. The rotor as claimed in claim 1, wherein
   the filler material is aluminum or an aluminum alloy.

6. The rotor as claimed in claim 1, wherein
   all of the flux barriers which extend radially outward to the radially outer surface of the rotor are filled with the filler material in the peripheral region of the rotor.

7. The rotor as claimed in claim 1, wherein
the first arcuate curved edge is convex in the direction along the at least one of the plurality of flux barriers leading to the radially outer surface of the rotor.

8. The rotor as claimed in claim 7, wherein
the web has a second arcuate curved edge facing into a second portion of the at least one of the plurality of flux barriers extending away from the direction along the at least one of the plurality of flux barriers leading to the radially outer surface of the rotor,
the second arcuate curved edge faces into a non-filled region of the at least one of the plurality of flux barriers in the inner region of the rotor.

9. A synchronous reluctance machine, comprising
at least one rotor as claimed in claim 1,
wherein the machine does not include a frequency converter.

10. A method for manufacturing a rotor for a synchronous reluctance machine having a cylindrical soft-magnetic element and a filler material, wherein the soft-magnetic element includes a plurality of flux barriers in the form of cutouts arranged circumferentially about a rotational axis of the rotor, the cylindrical soft-magnetic element includes outer webs at a radially outer surface of cylindrical soft-magnetic element extending circumferentially over radially outer ends of a portion of the plurality of flux barriers in a peripheral region of rotor, and at least one of the plurality of flux barriers is subdivided by a web having a first arcuate curved edge facing into a first portion of the at least one of the plurality of flux barriers which extends to the radially outer surface of the rotor, comprising the acts of:

filling, at least partially, at least one of the flux barriers with the filler material in a first portion of the plurality of flux barriers located in the peripheral region of rotor such that the filler material extends radially outward to a corresponding one of the outer webs; and reducing a radius of the radially outer surface of the cylindrical soft-magnetic element an amount sufficient to remove a least portions of the outer webs such that the filler material extends to the radially outer surface.

11. The method for manufacturing a rotor as claimed in claim 10, wherein
the outer webs are completely removed.

12. The method as claimed in claim 11, wherein
in the act of reducing the radius of the radially outer surface of the cylindrical soft-magnetic element, the radius is reduced by turning.

13. The method as claimed in claim 12, wherein
in the filling act, the filler material is introduced into the at least one flux barrier by casting.

14. The method as claimed in claim 13, wherein
the casting is conducted by die-casting.

* * * * *